United States Patent
Erdman et al.

(10) Patent No.: US 9,405,086 B2
(45) Date of Patent: Aug. 2, 2016

(54) ORGANIZER TRAY, FIBER-ROUTING ASSEMBLY, AND ELECTRO-OPTICAL MODULE

(71) Applicant: Tyco Electronics Corporation, Berwyn, PA (US)

(72) Inventors: David Donald Erdman, Hummelstown, PA (US); Shelly Ann Buchter, East Berlin, PA (US); Michael Tryson, Hanover, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 12 days.

(21) Appl. No.: 14/496,421

(22) Filed: Sep. 25, 2014

(65) Prior Publication Data

US 2016/0091686 A1 Mar. 31, 2016

(51) Int. Cl.
*G02B 6/00* (2006.01)
*G02B 6/44* (2006.01)
*G02B 6/43* (2006.01)
*G02B 6/42* (2006.01)

(52) U.S. Cl.
CPC .............. *G02B 6/4453* (2013.01); *G02B 6/428* (2013.01); *G02B 6/4249* (2013.01); *G02B 6/4281* (2013.01); *G02B 6/43* (2013.01)

(58) Field of Classification Search
CPC ........................... G02B 6/4281; G02B 6/3612
See application file for complete search history.

(56) References Cited

U.S. PATENT DOCUMENTS

| | | | |
|---|---|---|---|
| 6,442,322 B1 * | 8/2002 | Chen | G02B 6/3608 385/137 |
| 6,600,860 B2 | 7/2003 | Sun et al. | |
| 6,885,800 B2 | 4/2005 | Sun et al. | |
| 6,968,097 B2 * | 11/2005 | Arima | G02B 6/43 385/137 |
| 6,996,301 B2 * | 2/2006 | Arima | G02B 6/3608 385/137 |
| 7,092,592 B2 | 8/2006 | Verhagen et al. | |
| 7,606,458 B2 * | 10/2009 | Hermsen | G02B 6/4452 385/135 |
| 2002/0015563 A1 * | 2/2002 | Murakami | G02B 6/43 385/53 |
| 2002/0081087 A1 * | 6/2002 | Chen | G02B 6/3608 385/134 |
| 2002/0090191 A1 * | 7/2002 | Sorosiak | G02B 6/3608 385/137 |
| 2002/0106161 A1 * | 8/2002 | Kiani | G02B 6/3612 385/53 |
| 2002/0131719 A1 * | 9/2002 | Grois | G02B 6/3608 385/59 |
| 2003/0198427 A1 * | 10/2003 | Bragg | G02B 6/43 385/14 |
| 2004/0033005 A1 * | 2/2004 | Arima | G02B 6/43 385/14 |
| 2004/0136638 A1 | 7/2004 | Baechtle et al. | |
| 2008/0002936 A1 | 1/2008 | Sun | |
| 2012/0008900 A1 * | 1/2012 | Schneider | G02B 6/3608 385/50 |
| 2013/0064495 A1 | 3/2013 | Eberle, Jr. | |

OTHER PUBLICATIONS

Fiber Optic Products Catalog, 2012, 7 pages, TE Connectivity, www.te.com.
"LIGHTRAY OFX Optical Fiber Circuit Assemblies", Fiber Optic Products Catalog, 2006, 2 pages, Tyco Electronics, www.tycoelectronics.com.
"Molex Flex Plane Optical Circuitry", 2012, 3 pages, Molex, www.molex.com/fiber/flexplane.html, U.S.

* cited by examiner

*Primary Examiner* — Rhonda Peace (57) ABSTRACT

Organizer tray including a base wall and a receiving wall that is coupled to the base wall. The base and receiving walls extend parallel to each other along a lateral axis. The receiving wall extends away from the base wall along an elevation axis that is perpendicular to the lateral axis such that the base and receiving walls define a circuit channel. The receiving wall has a curved shape. The base and receiving walls are shaped to hold a flex circuit assembly within the circuit channel, in which the flex circuit assembly includes a fiber-routing substrate and corresponding segments of optical fibers that extend within the fiber-routing substrate. The base and receiving walls are configured to hold the fiber-routing substrate such that the fiber-routing substrate satisfies a bend radius of the optical fibers.

20 Claims, 6 Drawing Sheets

ORGANIZER TRAY, FIBER-ROUTING ASSEMBLY, AND ELECTRO-OPTICAL MODULE

BACKGROUND

The subject matter herein relates generally to methods and components for routing optical fibers to interconnect different communication devices.

Communication systems, such as routers, servers, switches, data centers, and the like, may be large, complex systems that have a number of devices interconnected to one another. Such systems often use optical fibers to interconnect different portions of the systems. Optical fibers are flexible, thin fibers of transparent material that transmit light signals (called optical signals) through total internal reflection. Depending on the size of the system, there may be tens, hundreds, or thousands of optical fibers. It is known that the optical signals may attenuate if the optical fibers are bent too sharply. Due to the number of optical fibers in a system and the nature of the optical fibers, it can be challenging to manage and route the optical fibers through the system.

In one conventional method for routing the optical fibers, several optical fibers are affixed to a side of a flexible, sheet-like substrate. The optical fibers are positioned and pressed onto an adhesive layer of the substrate such that the optical fibers are held in fixed positions with respect to one another in a desired circuit pattern. The optical fibers may have different paths along the substrate. For example, although the optical fibers may enter the substrate in parallel, the paths of the optical fibers may curve away from each other or cross-over each other so that the optical fibers exit the substrate at various locations desired by the user. Accordingly, the substrate holds the optical fibers in fixed positions with respect to one another and along predetermined paths that do not go below a predetermined bend radius. Similar methods include positioning the optical fibers in a desired circuit pattern along a sheet-like substrate and then applying a coating over the optical fibers and allowing the coating to cure.

Although the above substrates may be effective in managing and routing the optical fibers, they may have certain drawbacks. Communication systems have become smaller and/or denser in recent years. The substrates may require an excessive amount of space within the communication system that might otherwise be used for other components.

Accordingly, a need exists for a component that facilitates routing optical fibers between different communication devices while reducing space requirements.

BRIEF DESCRIPTION

In an embodiment, an organizer tray is provided that includes a base wall and a receiving wall that is coupled to the base wall. The base and receiving walls extend parallel to each other along a lateral axis. The receiving wall extends away from the base wall along an elevation axis that is perpendicular to the lateral axis such that the base and receiving walls define a circuit channel. The receiving wall has a curved shape. The base and receiving walls are shaped to hold a flex circuit assembly within the circuit channel, in which the flex circuit assembly includes a fiber-routing substrate and corresponding segments of optical fibers that extend within the fiber-routing substrate. The base and receiving walls are configured to hold the fiber-routing substrate such that the fiber-routing substrate satisfies a bend radius of the optical fibers.

In an embodiment, a fiber-routing assembly is provided. The fiber-routing assembly includes a flex circuit assembly having a fiber-routing substrate and optical fibers that are coupled to the fiber-routing substrate along corresponding fiber segments. The corresponding fiber segments have predetermined paths along the fiber-routing substrate and are held in fixed positions with respect to one another by the fiber-routing substrate. The optical fibers have corresponding fiber tails that extend away from the fiber-routing substrate. The fiber-routing assembly also includes an organizer tray having a base wall and a receiving wall coupled to each other. The base and receiving walls extend parallel to each other along a lateral axis. The receiving wall extends away from the base wall along an elevation axis that is perpendicular to the lateral axis such that the base and receiving walls define a circuit channel. The fiber-routing substrate is positioned within the circuit channel and held by the base and receiving walls such that the fiber-routing substrate has a curved contour. The curved contour satisfies a bend radius of the optical fibers.

In an embodiment, an electro-optical (EO) module is provided that includes a circuit board and a plurality of active devices that are mounted to the circuit board and configured to process data signals. The EO module also includes a fiber-routing assembly having a flex circuit assembly that includes a fiber-routing substrate and optical fibers that are coupled to the fiber-routing substrate along corresponding fiber segments. The optical fibers have first fiber tails and second fiber tails that extend in generally opposite directions away from the fiber-routing substrate. The optical fibers are configured to transmit the data signals therethrough. The fiber-routing assembly also includes an organizer tray having a fixed position with respect to the circuit board and defining a circuit channel. The organizer tray holds the fiber-routing substrate within the circuit channel such that the fiber-routing substrate has a curved contour that satisfies a bend radius of the optical fibers.

DETAILED DESCRIPTION

Figure 1:
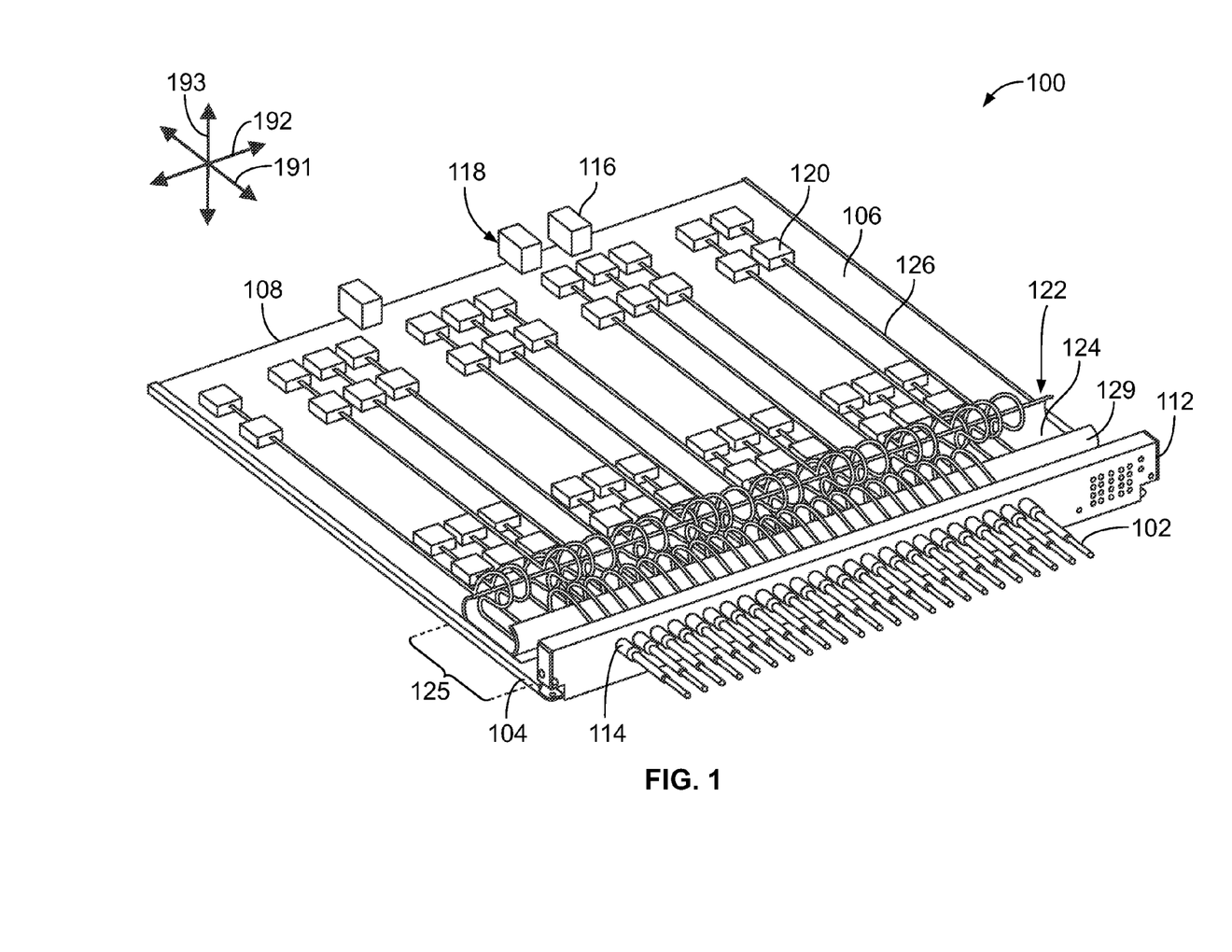
FIG. 1 is a perspective view of an electro-optical (EO) module in accordance with an embodiment.

FIG. 1 is a perspective view of an electro-optical (EO) module 100 formed in accordance with an embodiment. The EO module 100 is configured to communicatively engage one or more optical cable assemblies 102. In FIG. 1, the EO module 100 is oriented with respect to mutually perpendicular axes 191-193, including a mating axis 191, a lateral axis 192, and an elevation axis 193. It should be understood that the EO module 100 is not limited to any particular orientation with respect to gravity. The EO module 100 includes a support frame or panel 104 and a printed circuit board 106 that is coupled to and extends alongside the support frame 104. The support frame 104 may be, for example, stamped and formed from sheet metal to grip the circuit board 106. The circuit board 106 includes a mating edge 108 and an opposite loading edge (not shown). The EO module 100 also includes a face plate 112 that is coupled to the support frame 104 and extends parallel to the loading edge of the printed circuit board 106. The face plate 112 includes optical connectors 114 that mate with pluggable ends of the optical cable assemblies 102.

In some embodiments, the EO module 100 may also include board connectors 116 that are mounted along the mating edge 108. In operation, the EO module 100 may be mated with another component (not shown) of a communication system (not shown). For example, the board connectors 116 having mating sides 118 that face away from the circuit board 106 along the mating axis 191. In particular embodiments, the board connectors 116 may be mated to corresponding header connectors (not shown) of a backplane (not shown) of the communication system. Data signals (in the form of optical signals) are transmitted through the optical cable assemblies 102 to the EO module 100 and/or transmitted through the EO module 100 to the optical cable assemblies 102. To this end, the EO module 100 also includes active devices 120 that are mounted to the circuit board 106 and a flex circuit assembly 124. The flex circuit assembly 124 includes optical fibers 126 that communicatively couple the optical connectors 114 and the active devices 120. Each of the optical fibers 126 shown in FIG. 1 may be an individual optical fiber or a plurality of individual optical fibers grouped together. For embodiments that include a plurality of optical fibers, the plurality of optical fibers may be referred to as an optical ribbon or ribbon fiber.

Also shown in FIG. 1, the EO module 100 includes an organizer tray 129 that is mounted in a fixed position with respect to the circuit board 106. In the illustrated embodiment, the organizer tray 129 is secured to the support frame 104 within an operative gap or channel 125 that exists between the loading edge of the circuit board 106 and the face plate 112. The loading edge is hidden behind the organizer tray 129 in FIG. 1. The operative gap 125 may have other sizes than shown in FIG. 1. The operative gap 125 may be, for example, between 50 millimeters (mm) to about 150 mm. In particular embodiments, the operative gap 125 may be between 80 mm and 120 mm. However, the operative gap 125 may be smaller or larger in other embodiments.

In other embodiments, the organizer tray 129 may be mounted directly to the circuit board 106 or may be directly coupled to both the circuit board 106 and the support frame 104. The organizer tray 129 is configured to receive a portion of the flex circuit assembly 124. The organizer tray 129 and the flex circuit assembly 124 may constitute a fiber-routing assembly 122 of the EO module 100. As described herein, the fiber-routing assembly 122 may reduce a size of the flex circuit assembly 124 in at least one dimension and/or increase tolerances of the optical fibers 126 during assembly.

The active devices 120 are configured to process the data signals that are transmitted through the EO module 100. By way of example, the active devices 120 may be electro-optical engines or transceivers that transform data signals from an electrical form to an optical form or vice versa. In an exemplary embodiment, the electro-optical engine may be similar to the Coolbit™ optical engine developed by TE Connectivity. The active devices 120 are communicatively coupled to the board connectors 116 through the circuit board 106. In other embodiments, the active devices 120 may be mounted along the mating edge 108.

Figure 2:
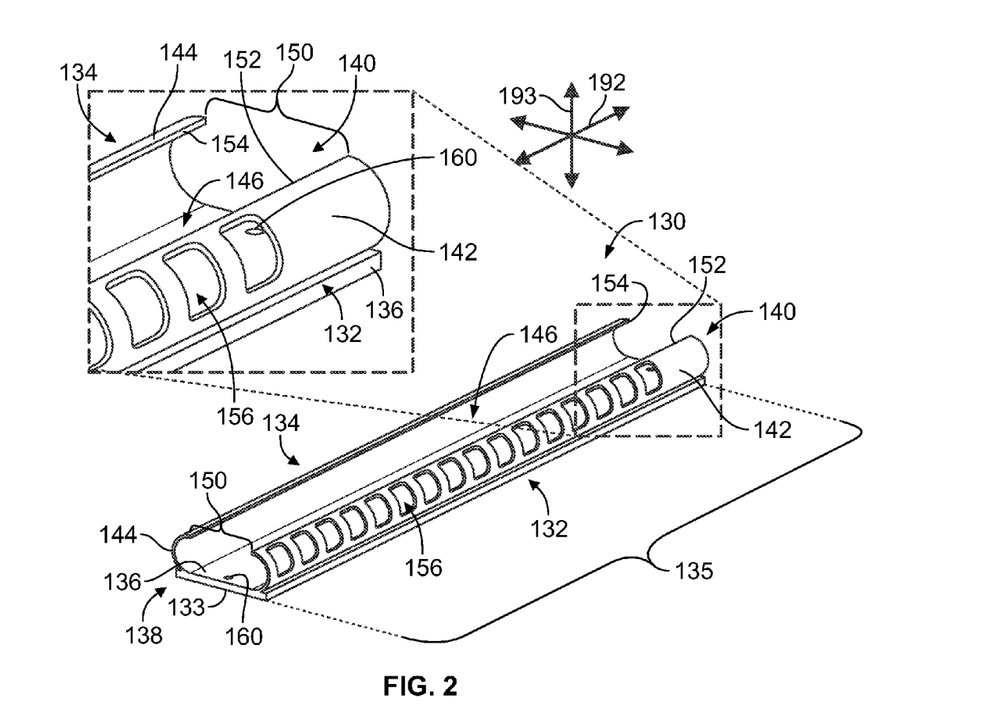
FIG. 2 is a perspective view of an organizer tray formed in accordance with an embodiment that may be used with the EO module of FIG. 1.

FIG. 2 is a perspective view of an organizer tray 130 formed in accordance with an embodiment. The organizer tray 130 is similar to the organizer tray 129 (FIG. 1) and may replace the organizer tray 129 in the fiber-routing assembly 122 (FIG. 1) and be part of the EO module 100 (FIG. 1). For example, the organizer tray 130 may be configured to hold the flex circuit assembly 124 (FIG. 1) during operation. In the illustrated embodiment, the organizer tray 130 is a single unitary piece of material that is shaped to include the features described herein. For example, the organizer tray 130 may be molded from a plastic material, stamped-and-formed from sheet metal, or fabricated through a 3D-printing process. In other embodiments, the organizer tray 130 may be assembled from multiple discrete elements to include the features described herein. For example, the organizer tray 130 may include one or more discrete walls that are coupled to each other and/or the support frame 104.

In the illustrated embodiment, the organizer tray 130 has first and second tray sides 132, 134 and a tray base 133 that extends between the first and second tray sides 132, 134. The first and second tray sides 132, 134 and the tray base 133 extend along the lateral axis 192 between first and second tray ends 138, 140. A tray length 135 may be defined between the first and second tray ends 138, 140 and measured along the lateral axis 192. The organizer tray 130 includes a first receiving wall 142, a second receiving wall 144, and a base wall 136. The first receiving wall 142 is coupled to and extends along the base wall 136 parallel to the lateral axis 192. The first tray side 132 may include the receiving wall 142. The second receiving wall 144 is coupled to and extends along the base wall 136 parallel to the lateral axis 192. The second tray side 134 may include the receiving wall 144.

In the illustrated embodiment, the first and second receiving walls 142, 144 extend parallel to each other from the first tray end 138 to the second tray end 140 for an entirety of the tray length 135. In alternative embodiments, the first and second receiving walls 142, 144 may not extend parallel to each other and/or may extend parallel to each other for only a portion of the tray length 135. In alternative embodiments, either or both the first and second receiving walls 142, 144 extend along only a portion of the tray length 135. Yet in other embodiments, the organizer tray 130 includes only one of the first or second receiving walls 142, 144.

As shown, the first and second receiving walls 142, 144 extend generally away from the base wall 136 along the elevation axis 193. In the illustrated embodiment, the first and second receiving walls 142, 144 do not extend perpendicular to the base wall 136 in a planar manner. Instead, the first and second receiving walls 142, 144 have a curved shaped. The first and second receiving wall 142, 144 extend to respective distal edges 152, 154. Optionally, the first receiving wall 142 may include windows 156. The windows 156 may enable an individual to grip the organizer tray 130. In some embodiments, the windows 156 may reduce a weight of the organizer tray and/or simplify manufacturability. In some embodiments, the windows 156 may allow air flow therethrough and/or permit the optical fibers 126 (FIG. 1) to extend therethrough. In FIG. 2, the second receiving wall 144 does not include windows. However, in other embodiments, the second receiving wall 144 may include windows.

As shown, the first and second receiving walls 142, 144 and the base wall 136 may define a circuit channel 146. In the illustrated embodiment, the circuit channel 146 is defined between the first and second receiving walls 142, 144 with the base wall 136 defining a bottom of the circuit channel 146. In alternative embodiments that include only one receiving wall, the circuit channel 146 may be defined by the base wall 136 and the single receiving wall, such as the receiving wall 142 or the receiving wall 144.

The circuit channel 146 is configured to have the flex circuit assembly 124 (FIG. 1) positioned therein. In an exemplary embodiment, the organizer tray 130 is open-sided such that a tray opening or gap 150 exists between the distal edges 152, 154. In some embodiments, the tray opening 150 may remain exposed during operation. In other embodiments, the tray opening 150 may be covered.

The organizer tray 130 may be configured to be secured in a fixed position relative to other communication components or devices. For example, in an exemplary embodiment, the organizer tray 130 is secured in a fixed position with respect to the circuit board 106 (FIG. 1) and/or the face plate 112 (FIG. 1). Optionally, the organizer tray 130 may include fastener holes 160 that are configured to receive corresponding fastening hardware, such as screws or plugs. Alternatively or in addition to the hardware, the organizer tray 130 may be secured in a fixed position using an adhesive or a frictional engagement with other components of the EO module 100.

Figure 3:
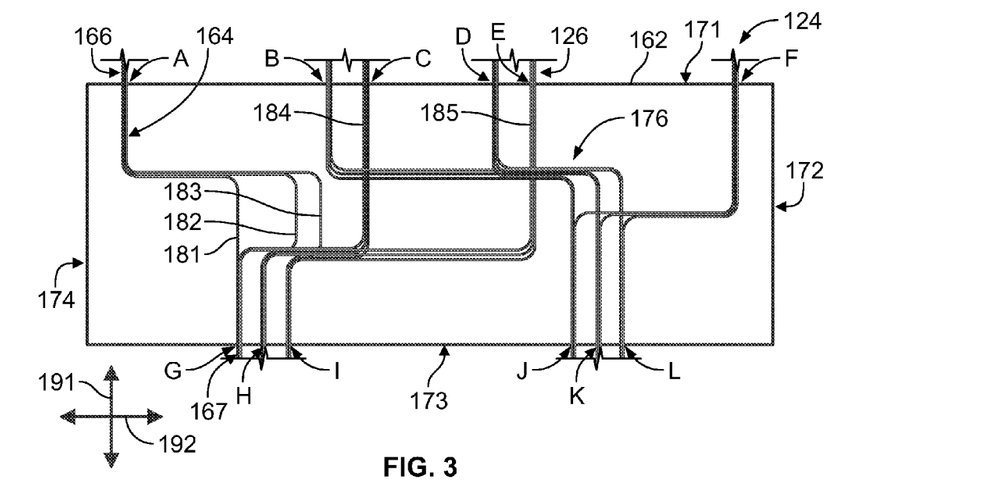
FIG. 3 is a plan view of a flex circuit assembly prior to the flex circuit assembly being positioned within the organizer tray of FIG. 2.

FIG. 3 is a plan view of the flex circuit assembly 124 prior to the flex circuit assembly 124 being positioned within the circuit channel 146 (FIG. 2) of the organizer tray 130 (FIG. 2). The organizer tray 130 may be configured to bend or shape one or more portions of the flex circuit assembly 124 when positioned therein. The flex circuit assembly 124 includes the optical fibers 126 (or optical ribbons) and a fiber-routing substrate 162 that is coupled to the optical fibers 126. The fiber-routing substrate 162 may include one or more layers of flexible material. By way of example, the fiber-routing substrate 162 may include one or more layers of polyimide, such as Kapton®. Other flexible materials, however, may be used in addition to polyimide or in place of polyimide. The fiber-routing substrate 162 may be flexible such that a shape of the fiber-routing substrate 162 is determined by a surface that engages the fiber-routing substrate 162. In other embodiments, however, the fiber-routing substrate 162 may include one or more rigid bodies that provide a non-planar contour to the fiber-routing substrate 162. For example, the fiber-routing substrate 162 may include a rigid insert that provides the fiber-routing substrate 162 with a curved contour.

The optical fibers 126 include corresponding fiber segments 164 that are directly attached to and extend along the fiber-routing substrate 162. By way of example, the corresponding fiber segments 164 of the optical fibers 126 extend from an entry point A to an exit point G. The optical fibers 126 also include fiber tails 166, 167 that extend away from the fiber-routing substrate 162. The fiber tails 166 are configured to couple to the face plate 112 (FIG. 1) and may be referred to as loading tails or first fiber tails. The fiber tails 167 are configured to couple to the active devices 120 (FIG. 1) and may be referred to as mating tails or second fiber tails. The fiber tails 166, 167 may be capable of moving independently with respect to other fiber tails 166, 167. The corresponding fiber segments 164, however, are held in fixed positions with respect to one another along predetermined paths. Collectively, the predetermined paths form a circuit pattern 176.

The corresponding fiber segments 164 may be entirely embedded such that the fiber-routing substrate 162 encases the corresponding fiber segments 164. The corresponding fiber segments 164 may also extend along a surface of the fiber-routing substrate 162 and/or be partially encased or embedded within the fiber-routing substrate 162. For example, the fiber-routing substrate 162 may include a base layer of polyimide in which the corresponding fiber segments 164 are placed along a surface of the polyimide. An adhesive material may then be sprayed onto the surface and the corresponding fiber segments 164 and allowed to cure thereby affixing the corresponding fiber segments 164 to the base layer. Alternatively, the corresponding fiber segments 164 may be positioned in the desired circuit pattern 176 along the fiber-routing substrate 162 and then pressed into the fiber-routing substrate 162. As another alternative, the corresponding fiber segments 164 may be positioned in the desired circuit pattern 176 and a polymer may be molded around the circuit pattern 176 and permitted to cure into the fiber-routing substrate 162.

The fiber-routing substrate 162 has substrate edges 171-174 that define a profile of the fiber-routing substrate 162 as shown in the plan view of FIG. 3. Optical fibers 126 may enter one of the substrate edges and exit another substrate edge of the fiber-routing substrate 162. By way of example, each of the optical fibers 126 enters the substrate edge 171 and exits the substrate edge 173. It should be understood that the terms "enter" and "exit" are only used to describe the paths taken by the optical fibers 126. Optical signals may travel in either direction through the optical fibers 126. In alternative embodiments, one or more optical fibers 126 may enter one substrate edge and exit through the same substrate edge.

In the illustrated embodiment, the profile of the fiber-routing substrate 162 is substantially rectangular. The profile of the fiber-routing substrate 162, however, may have other shapes. For example, the profile may be similar to a circle, triangle, hexagon, heptagon, or other polygon. The shapes may include irregular shapes. Optionally, the profile may include extensions. For instance, while a major portion of the profile of the fiber-routing substrate 162 may be rectangular as shown in FIG. 3, one or more extensions may project from one or more of the substrate edges.

The fiber-routing substrate 162 is configured to hold the corresponding fiber segments 164 in fixed positions with respect to one another. The fiber-routing substrate 162 is configured to maintain the predetermined paths taken by the corresponding fiber segments 164. In particular, the fiber-routing substrate 162 may ensure that the optical fibers 126 do not bend beyond a bend radius of the corresponding optical fibers 126. The optical fibers 126 may have a bend radius that is based on dimensions and material(s) of the optical fibers 126. If an optical fiber is bent to have a radius of curvature that is less than the designated bend radius (i.e., a sharper bend), the optical signals may be attenuated and, possibly, the optical fiber may be damaged. The fiber-routing substrate 162 is configured to prevent the corresponding fiber segments 164 from bending beyond the bend radius such that the optical signals are attenuated and/or the optical fiber is damaged.

In the circuit pattern 176 shown in FIG. 3, all of the optical fibers 126 extend parallel to the axis 191 for a portion of the corresponding fiber segment 164 and parallel to the lateral axis 192 for a portion of the corresponding fiber segment 164. At least one of the fiber segments 164 may extend non-parallel with respect to the other fiber segments 164. In some embodiments, at least some of the fiber segments 164 cross over (or under) other fiber segments 164 while extending through the fiber-routing substrate 162. As such, the fiber segments 164 have a first designated arrangement with respect to one another when entering the substrate edge 171 and have a second designated arrangement with respect to one another when exiting the substrate edge 173.

By way of example, the optical fibers 126 enter through the substrate edge 171 along six separate entry points A, B, C, D, E, and F and exit through the substrate edge 173 along six separate exit points G, H, I, J, K, and L. (Alternatively, the optical fibers 126 may be characterized as entering through the substrate edge 173 along six separate entry points G, H, I, J, K, and L and exiting through the substrate edge 171 along six separate exit points A, B, C, D, E, and F.) The optical fibers 126 entering through the substrate edge 171 at entry point A split into three different fiber groups 181-183. In this example, each fiber group 181-183 includes a plurality of the optical fibers 126, but it is possible that only one optical fiber 126 may split from other optical fibers 126 in alternative embodiments. The fiber group 181 exits through the substrate edge 173 at exit point G, the fiber group 182 exits through the exit point H, and the fiber group 183 exits through the exit point I. Each of the fiber groups 181-183 is joined by other fiber groups from the other entry points B-F. For example, the fiber group 181 is joined by a fiber group 184 from the entry point C and a fiber group 185 from entry point E. When a fiber group of the fiber segments 164 crosses over another fiber group of fiber segments 164, the intersecting fiber groups may still be embedded and/or attached to each other through the fiber-routing substrate 162.

It should be understood that FIG. 3 illustrates only one circuit pattern 176 and that other circuit patterns may be formed with the fiber segments. For example, in some embodiments, a fiber group of fiber segments 164 may extend through the fiber-routing substrate 162 without splitting and/or crossing over (or under) other fiber segments 164. Optionally, one or more of the fiber segments 164 may extend straight through the fiber-routing substrate 162 parallel to the mating axis 191. In some embodiments, the optical fibers 126 may exit through other substrate edges, such as the substrate edges 172, 174, or exit back through the substrate edge 171.

The optical fibers 126 within the EO module 100 (FIG. 1) may be grouped together when the optical fibers 126 are separate from the fiber-routing substrate 162. Optionally, the optical fibers 126 that are grouped together within the EO module 100 may be surrounded by a common jacket or protective layer. For example, the fiber tails 166 of the optical fibers 126 at entry point A may be collectively surrounded by a jacket (not shown) that holds the fiber tails 166. As described above, a group of fiber tails with or without the jacket may be referred to as a ribbon fiber, optical ribbon, or optical cable. In some embodiments, the optical fibers (e.g., of the optical cable assemblies 102) may be jacketed outside of the EO module 100.

Figure 4:
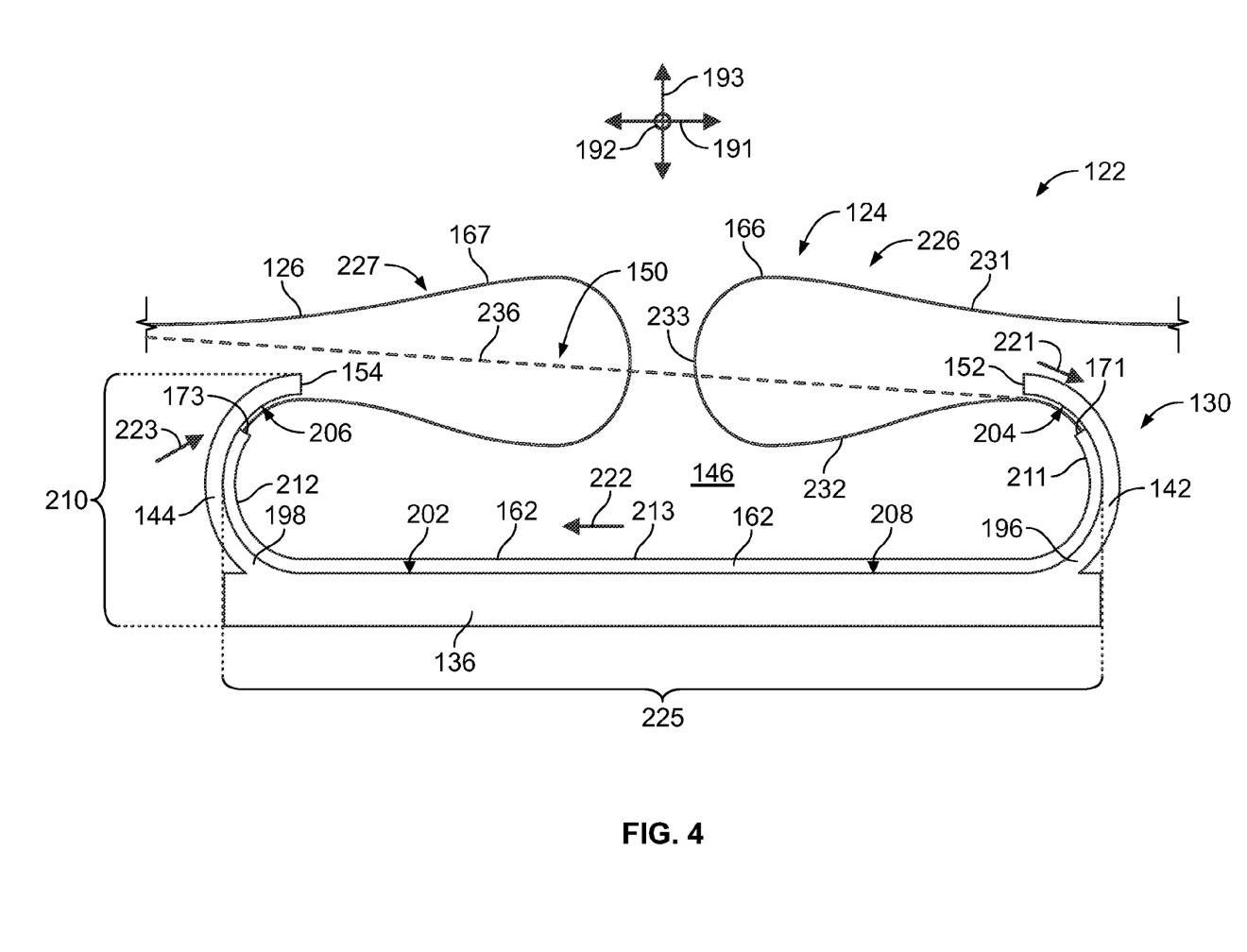
FIG. 4 is a side view of a fiber-routing assembly in accordance with an embodiment that includes the organizer tray of FIG. 2 and the flex circuit assembly of FIG. 3.

FIG. 4 is a side view of the fiber-routing assembly 122 including the organizer tray 130 and the flex circuit assembly 124. As shown, the organizer tray 130 is holding the flex circuit assembly 124 within the circuit channel 146. In the illustrated embodiment, the fiber-routing substrate 162 continuously abuts the base wall 136 and the first and second receiving walls 142, 144. Collectively, the base wall 136 and the first and second receiving walls 142, 144 define a channel surface 202. In the illustrated embodiment, the channel surface 202 is substantially smooth without discontinuities or abrupt changes. For example, the channel surface 202 may not include portions that engage the fiber-routing substrate 162 such that the fiber-routing substrate 162 has a contour that bends the optical fibers 126 beyond the bend radius of the optical fibers 126. The fiber-routing substrate 162 may have a flexibility such that a shape or contour of the fiber-routing substrate 162 is effectively defined by the shape or contour of the channel surface 202. In other embodiments, the channel surface 202 may include one or more discontinuities or abrupt changes. In such embodiments, the fiber-routing substrate 162 may have at least some rigidity that prevents the fiber-routing substrate 162 from having a radius of curvature that is sharper than the bend radius of the optical fibers 126.

The base wall 136 and the first and second receiving walls 142, 144 extend parallel to one another along the lateral axis 192. The first and second receiving walls 142, 144 extend away from the base wall 136 along the elevation axis 193. More specifically, the first receiving wall 142 extends from a proximal joint 196 to the distal edge 152, and the second receiving wall 144 extends from a proximal joint 198 to the distal edge 154. The proximal joints 196, 198 join the first and second receiving walls 142, 144, respectively, to the base wall 136. The first and second receiving walls 142, 144 may extend along a height 210 of the organizer tray 130 that is measured along the elevation axis 193. In the illustrated embodiment, each of the first and second receiving walls 142, 144 extends to the full height 210. In alternative embodiments, only one of the first and second receiving walls 142, 144 may extend to the full height 210.

The first receiving wall 142 has a bend area or surface 204 of the channel surface 202, and the second receiving wall 144 has a bend area or surface 206 of the channel surface 202. The base wall 136 has a base area or surface 208 of the channel surface 202. In the illustrated embodiment, the base area 208 is substantially planar or, more specifically, extends parallel to a plane defined by the mating axis 191 and the lateral axis 192. The bend areas 204, 206, however, are not planar. Each of the bend areas 204, 206 may have a corresponding radius of curvature. In the illustrated embodiment, the radii of curvature are the same. However, in other embodiments, the radii of curvature may be different. In particular embodiments, the first and second receiving walls 142, 144 are C-shaped or, more specifically, the bend areas 204, 206 are C-shaped.

The bend areas 204, 206 and the base area 208 collectively form the channel surface 202. The channel surface 202 may be substantially smooth such that the bend areas 204, 206 and the base area 208 are not structurally differentiated. In other embodiments, the bend areas 204, 206 and the base area 208 may be structurally differentiated due to changes in continuity of the channel surface 202. For example, each of the first and second receiving walls 142, 144 may be a discrete element that is secured to the base wall 136 with a joint or seam separating the two elements.

The fiber-routing substrate 162 is positioned within the circuit channel 146. The fiber-routing substrate 162 engages and extends alongside each of the bend areas 204, 206 and the base area 208. The fiber-routing substrate 162 has a shape that is determined by the channel surface 202. More specifically, a curved portion 211 of the fiber-routing substrate 162 may have a shape that is determined by the bend area 204 of the receiving wall 142, a curved portion 212 of the fiber-routing substrate 162 may have a shape that is determined by the bend area 206 of the receiving wall 144, and a center portion 213 of the fiber-routing substrate 162 may have a shape that is determined by the base area 208 of the base wall 136.

The fiber-routing substrate 162 is held such that the fiber-routing substrate 162 has a non-planar contour. With a non-planar contour, the fiber-routing substrate 162 may require less space along a dimension 225 that extends along the mating axis 191. More specifically, the first and second receiving walls 142, 144 may effectively reduce the dimension 225 extending along the mating axis 191. Instead, portions of the fiber-routing substrate 162 are directed along the elevation axis 193. More specifically, the curved portion 211 has a curved contour that extends along the elevation axis 193 and satisfies a bend radius of the optical fibers 126, and the curved portion 212 has a curved contour that extends along the elevation axis 193 and satisfies the bend radius of the optical fibers 126. Each of the curved contours causes the dimension 225 to reduce in size. More specifically, the dimension 225 extends between the substrate edges 171, 173 of the fiber-routing substrate 162. The dimension 225 may be, for example, a width of the fiber-routing substrate 162. The curved contours reduce the space necessary for receiving the width of the fiber-routing substrate 162. Without the first and second receiving walls 142, 144, the dimension 225 may be effectively longer during operation.

In some embodiments, the fiber-routing substrate 162 may be curved such that the substrate edges 171, 173 are positioned over the fiber-routing substrate 162 with respect to the elevation axis 193. Likewise, in some embodiments, the fiber tails 166, 167 may extend away from the substrate edges 171, 173, respectively, such that the fiber tails 166, 167 extend at least partially backward and overlap with respect to the fiber-routing substrate 162 within the circuit channel 146. The fiber tails 166, 167 may also be characterized as extending over or being positioned over the fiber-routing substrate 162. More specifically, the fiber tails 166, 167 extend over the center portion 213 of the fiber-routing substrate 162 in FIG. 4. As used herein, the phrases "extend over," "positioned over," and the like when used with respect to the fiber tails 166, 167 or the substrate edges 171, 173 do not require a particular orientation with respect to gravity. Instead, the elevation axis 193 may represent an axis that extends orthogonal to a plane defined by the mating axis 191 and the lateral axis 192. For instance, in some embodiments, the organizer tray 130 may be oriented such that the lateral axis 192 extends parallel to a gravitational force axis. In such embodiments, the fiber tails 166, 167 may extend over the center portion 213 or be positioned over the center portion 213.

Due to the shape of the fiber-routing substrate 162, the optical fibers 126 may be permitted to extend in multiple directions along a single axis. To illustrate, a single optical fiber 126 is shown in FIG. 4. When the optical fiber 126 enters the substrate edge 171, the optical fiber 126 is extending in a first direction 221 (indicated by an arrow in FIG. 4). The first direction 221 may include an x-component along the mating axis 191 and a y-component along the elevation axis 193. The x-component and y-component may be referred to generally as directional components. The optical fiber 126 then curves as the optical fiber 126 extends along the bend area 204 and then extends in a second direction 222 that is parallel to the mating axis 191. In the illustrated embodiment, the second direction 222 includes only an x-component along the mating axis 191 that is directionally opposite the x-component of the first direction 221. The optical fiber 126 then curves as the optical fiber 126 extends along the bend area 206 and extends in a third direction 223 as the optical fiber 126 exits the fiber-routing substrate 162. The third direction 223 may include an x-component that is directionally similar to the x-component of the first direction 221. The third direction 223 may also include a y-component that is directionally opposite the y-component of the first direction 221. Accordingly, the optical fiber 126 may have predetermined path that extends along the mating axis 191 in two different directions and the elevation axis 193 in two different directions. Although not shown, the optical fiber 126 may also have a z-component that extends parallel to the lateral axis 192.

In some embodiments, the fiber tails 166, 167 may include loop segments 226, 227, respectively. Similar to the corresponding fiber segments 164 (FIG. 3), the loop segments 226, 227 may have paths that extend in different directions along a single axis. For example, in the illustrated embodiment, each of the fiber tails 166, 167 extends in different directions along the mating axis 191. For example, the loop segment 226 includes a first sub-segment 231 that extends from the face plate 112 (FIG. 1) to an inflection point 233 positioned adjacent to the tray opening 150. In this direction, the first sub-segment 231 is extending right-to-left across the page. The loop segment 226, however, also includes a second sub-segment 232 that extends from the inflection point 233 to the substrate edge 171. In this direction, the second sub-segment 232 is extending left-to-right across the page. Accordingly, the loop segment 226 has a path that extends in two different directions along the mating axis 191. In the illustrated embodiment, the loop segments 226, 227 are substantially U-shaped with a single inflection point. However, other shapes may be formed in alternative embodiments.

Combined with the fiber segment 164 (FIG. 3) within the fiber-routing substrate 162 along the first receiving wall 142, the loop segment 226 may form an S-shaped path. Similarly, combined with the fiber segment 164 within the fiber-routing substrate 162 along the second receiving wall 144, the loop segment 227 may form an S-shaped path. Accordingly, in some embodiments, the flex circuit assembly 124 is shaped such that the optical fibers 126 extend along two S-shaped paths. Other embodiments, however, may form only one S-shaped path.

Embodiments that include the loop segments 226, 227 and/or the S-shaped paths may allow greater tolerance for manipulating the optical fibers 126 during assembly. The loop segments 226, 227 and/or the S-shaped paths may allow the optical fibers to be withdrawn or refracted greater distances than embodiments that do not include the loop segments 226, 227 and/or the S-shaped paths. For example, if it is necessary to re-terminate an optical fiber 126 during assembly of the EO module 100 (FIG. 1), a technician may push the optical fiber 126 toward the organizer tray 130 such that the S-shaped path expands or becomes larger. Alternatively, the technician may pull the optical fiber 126 away from the organizer tray 130 such that the S-shaped path shrinks or becomes smaller. In such embodiments, the technician may be permitted to re-terminate the optical fiber 126 without replacing the optical fiber 126 and/or the flex circuit assembly 124.

In other embodiments, the flex circuit assembly 124 may include optical fibers that do not form an S-shaped path. For example, as indicated by dashed line 236, the flex circuit assembly 124 may include a fiber tail 236 that does not form a loop segment. More specifically, the fiber tail 236 does not include an inflection point that is outside of the fiber-routing substrate 162 proximate to the tray opening 150. Instead, the fiber tail 236 extends over the distal edge 254, across the tray opening 150, passed the distal edge 252, to the substrate edge 171. Accordingly, the fiber tail 236 does not include an inflection point and extends only in one direction along the mating axis 191. Although not shown, another fiber tail may extend out of the substrate edge 173 in a direction toward the face plate 112 (FIG. 1).

Figure 5:
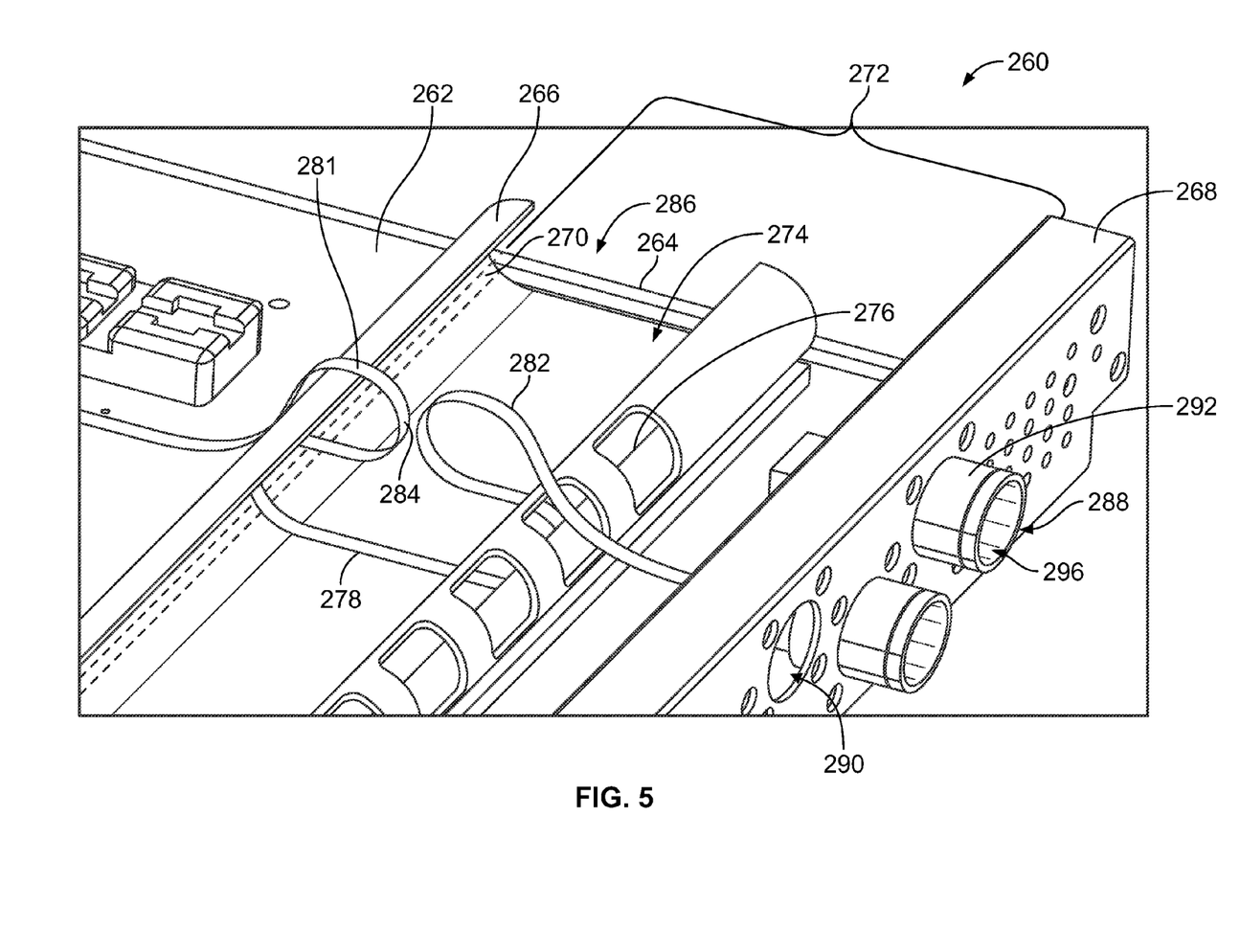
FIG. 5 is an enlarged perspective view of a portion of an EO module formed in accordance with an embodiment.

FIG. 5 is an enlarged perspective view of a portion of an EO module 260 formed in accordance with an embodiment. The EO module 260 may be similar to the EO module 100 (FIG. 1) and include similar or identical components. For example, the EO module 260 includes a circuit board 262, a support frame 264, and an organizer tray 266 that are identical to the circuit board 106 (FIG. 1), the support frame 104 (FIG. 1), and the organizer tray 130 (FIG. 2), respectively. The support frame 264 is coupled to the circuit board 262, and the organizer tray 266 is coupled to the support frame 264. The EO module 260 also includes a face plate 268 that is secured to the support frame 264. The circuit board 262 has a loading edge 270 (indicated by phantom lines). As shown, the organizer tray 266 is positioned within an operative gap 272 that exists between the loading edge 270 and the face plate 268.

The EO module 100 also includes a flex circuit assembly 274 having a fiber-routing substrate 276 and an optical ribbon 278. The optical ribbon 278 includes a plurality of optical fibers (not shown). Although only one optical ribbon 278 is shown in FIG. 5, the flex circuit assembly 274 may include a plurality of the optical ribbons 278. The optical ribbon 278 may be coupled to the fiber-routing substrate 276 in a similar manner as described above with respect to the flex circuit assembly 124 (FIG. 1). As shown, the optical ribbon 278 forms first and second loop segments 281, 282 that are positioned over the organizer tray 266. Each of the first and second loop segments 281, 282 includes a single inflection point 284 that is positioned proximate to an opening 286 of the organizer tray 266. As shown in FIG. 5, the optical ribbon 278 extends along the fiber-routing substrate 276 without branching into fiber groups and without turning to extend laterally along the fiber-routing substrate 276. However, as described above with respect to the optical fibers 126, the optical ribbon 278 may take alternative paths within the fiber-routing substrate 276.

Optionally, the EO module 100 includes one or more optical connectors 288 that couple to a respective optical ribbon 278. As shown, the face plate 268 has a plurality of connector apertures 290. Each of the connector apertures 290 is configured to receive one of the optical connectors 288. In the illustrated embodiment, the optical connectors 288 include respective connector housings 292 that form cable-receiving passages 296. The cable-receiving passages 296 are configured to receive a pluggable end of a cable assembly (not shown). The connector housings 292 may align the respective cable assemblies with the corresponding optical ribbons 278.

Figure 6:
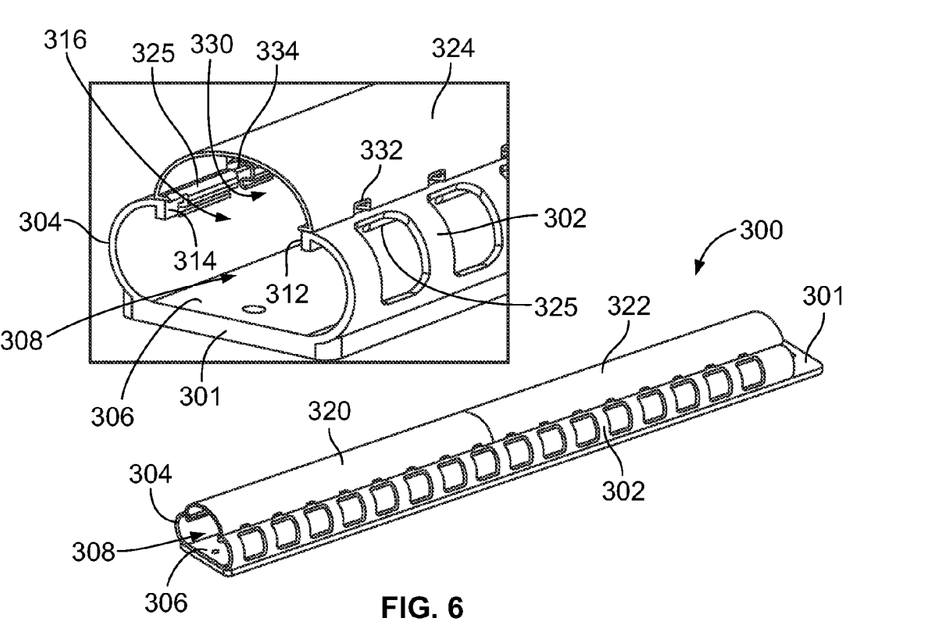
FIG. 6 is a perspective view of an organizer tray having a protective cover formed in accordance with an embodiment.

FIG. 6 is a perspective view of an organizer tray 300 formed in accordance with an embodiment. The organizer tray 300 includes a tray body 301 that is shaped similar to the organizer tray 130 (FIG. 2). For example, the tray body 301 includes first and second receiving walls 302, 304 and a base wall 306 extending therebetween. The first and second receiving walls 302, 304 form a circuit channel 308 therebetween. The tray body 301 may hold a flex circuit assembly (not shown) within the circuit channel 308. The flex circuit assembly may be similar or identical to the flex circuit assembly 124 (FIG. 1).

The organizer tray 300 also includes protective covers 320, 322 that are configured to protect the optical fibers or ribbons (not shown) within the circuit channel 308. The protective covers 320, 322 are configured to removably couple to the tray body 301. The protective covers 320, 322 may be identical in shape. In other embodiments, however, the protective covers 320, 322 may have different shapes. As shown in the enlarged view of FIG. 6, the first and second receiving walls 302, 304 have respective distal edges 312, 314 that define a tray opening 316 to the circuit channel 308. The protective cover 320 includes a cover wall 324 that extends between and engages the distal edges 312, 314. The cover wall 324 may frictionally engage the first and second receiving walls 302, 304 to hold the cover wall 324 in a substantially fixed position over the tray body 301. For example, the cover wall 324 may include latches 325 that grip the distal edges 312, 314. Also shown, the cover wall 324 has a convex shape that defines a fiber-receiving space 330 above the tray opening 316. The convex shape of the cover wall 324 or the fiber-receiving space 330 may effectively increase a size of the circuit channel 308 to allow bends in the optical fibers (not shown). For example, the fiber-receiving space 330 may allow optical fibers form loop segments, such as the loop segments described herein.

The organizer tray 300 may also form cover apertures 332, 334 that are sized and shaped to receiving one or more optical fibers or optical ribbons (not shown). The cover apertures 332 are distributed laterally along the first receiving wall 302, and the cover apertures 334 are distributed laterally along the second receiving wall 304. Although the cover apertures 332, 334 are defined between the corresponding receiving wall and the cover wall 324, the cover apertures 332, 334 may be entirely defined by the cover wall 324 or entirely defined by the corresponding receiving wall in other embodiments.

By way of example, an optical fiber (or optical ribbon) may extend through a corresponding cover aperture 332 and form a loop segment within the fiber-receiving space 330. The optical fiber may then extend through a fiber-routing substrate (not shown) along the first receiving wall 302, across the base wall 306, and along the second receiving wall 304. The optical fiber may then form another loop segment within the fiber-receiving space 330 and exit the organizer tray 300 through a corresponding cover aperture 334.

Figure 7:
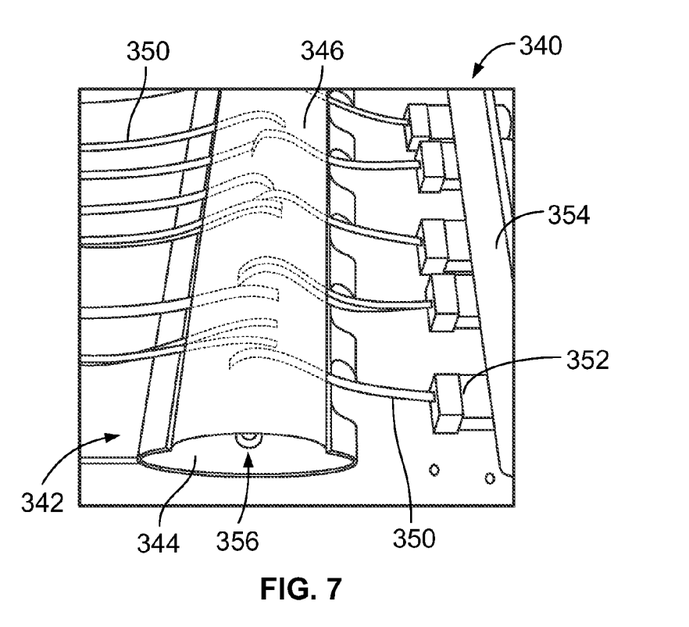
FIG. 7 is an illustration of a portion of an EO module formed in accordance with an embodiment.

FIG. 7 is an illustration of a portion of an EO module 340 formed in accordance with an embodiment. The EO module 340 is similar the EO module 100 (FIG. 1) and the EO module 260 (FIG. 5). As shown, the EO module 340 includes an organizer tray 342 having a tray body 344 and a protective cover 346. The tray body 344 and the protective cover 346 may be similar to the tray body 301 (FIG. 6) and the protective cover 320 (FIG. 6), respectively. As shown, a plurality of optical ribbons 350 extend through the organizer tray 342 and are coupled to corresponding optical connectors 352 along a face plate 354. The optical ribbons 350 may form loop segments within a circuit channel 356 defined by the tray body 344.

Figure 8:
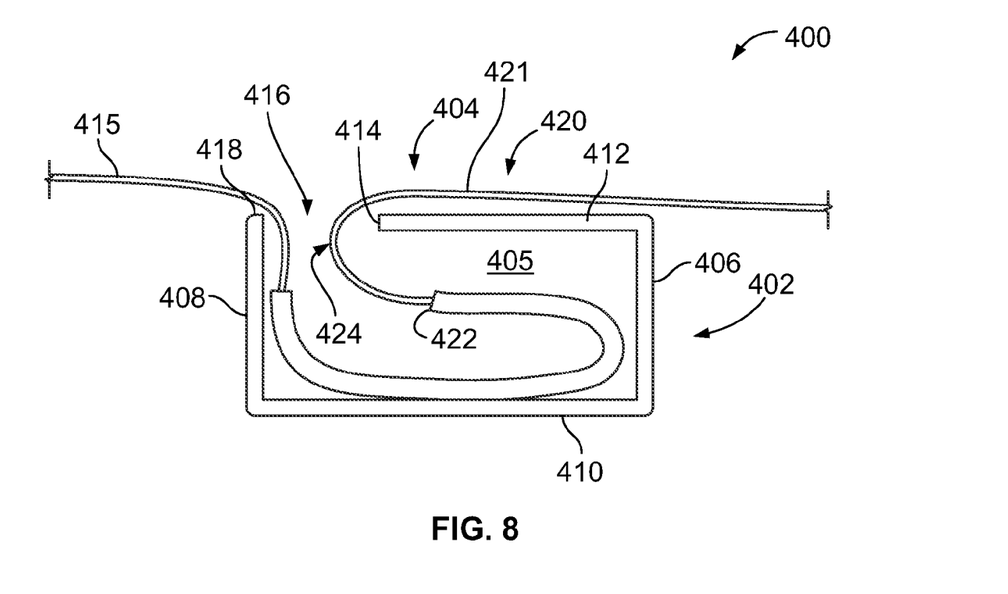
FIG. 8 is a side view of a fiber-routing assembly formed in accordance with an embodiment.

FIG. 8 illustrates a side view of a fiber-routing assembly 400. As shown, the fiber-routing assembly 400 includes an organizer tray 402 that is configured to hold a flex-circuit assembly 404 within a circuit channel 405 of the organizer tray 402. The organizer tray 402 includes first and second receiving walls 406, 408 and a base wall 410 that extends between the first and second receiving walls 406, 408. The organizer tray 402 also includes a cover wall 412 that extends from the first receiving wall 406 toward the second receiving wall 408. The first and second receiving walls 406, 408 oppose each other, and the base wall 410 and the cover wall 412 oppose each other. As shown, the first and second receiving walls 406, 408 are substantially planar and extend parallel to each other. In other embodiments, the first and second receiving walls 406, 408 may have curved contours that are similar to the first and second receiving walls 142, 144 (FIG. 2). Similar to other organizer trays described herein, the organizer tray 402 may hold the flex circuit assembly 404 in a manner that satisfies a bend radius of the optical fibers in an optical ribbon 415.

The cover wall 412 extends from the first receiving wall 406 to a distal edge 414. A tray opening 416 is defined between the distal edge 414 of the cover wall 412 and a distal edge 418 of the second receiving wall 408. Unlike other tray openings described above, the tray opening 416 is offset with respect to a center of the organizer tray 402. As shown, the optical ribbon 415 of the flex circuit assembly 404 forms a single loop segment 420. More specifically, the loop segment 420 includes a first sub-segment 421 that extends along the cover wall 412 exterior to the organizer tray 402, and a second sub-segment 422 that extends along the cover wall 412 within an interior of the organizer tray 402 (or the circuit channel 405). The loop segment 420 has an inflection point 424 that is located proximate to the tray opening 416. The remainder of the optical ribbon 415 does not form a loop segment. Accordingly, the optical ribbon 415 forms only a single loop segment 420.

Figure 9:
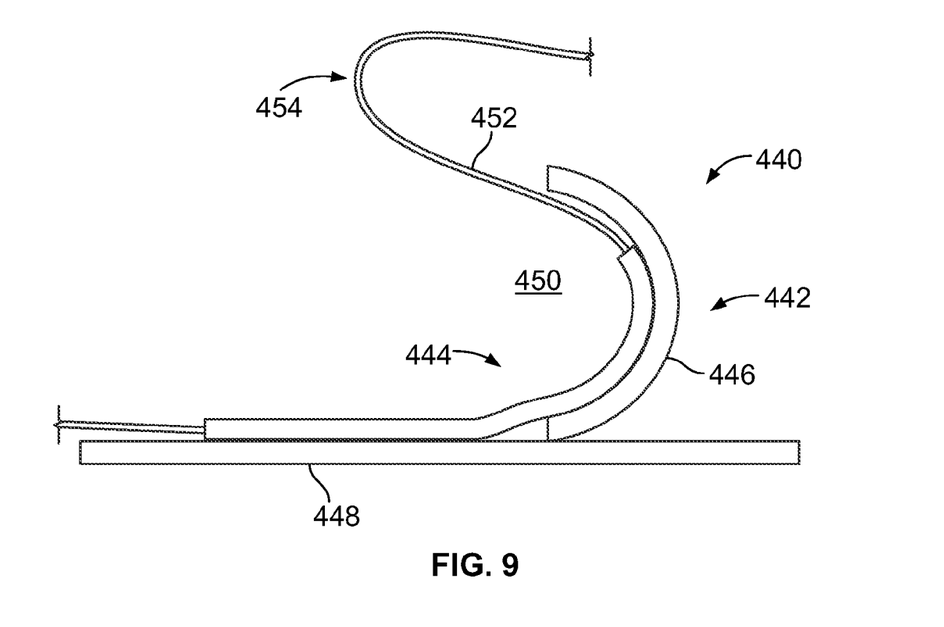
FIG. 9 is a side view of a fiber-routing assembly formed in accordance with an embodiment.

FIG. 9 illustrates a side view of a fiber-routing assembly 440 that includes an organizer tray 442 and a flex circuit assembly 444. Unlike other organizer trays described above, the organizer tray 442 includes only a single receiving wall 446. Moreover, the organizer tray 442 includes a base wall 448 that is distinct with respect to the receiving wall 446. In some embodiments, the base wall 448 may be a portion of a support frame of an EO module (not shown). Nonetheless, the receiving wall 446 and the base wall 448 may define a circuit channel 450 that receives the flex circuit assembly 444. Similar to other organizer trays described herein, the organizer tray 442 may hold the flex circuit assembly 444 in a manner that satisfies a bend radius of the optical fibers of an optical ribbon 452. As shown in FIG. 9, the optical ribbon 452 has a single loop segment 454.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. An organizer tray comprising:
   a base wall; and
   a receiving wall coupled to the base wall, the base and receiving walls extending parallel to each other along a lateral axis, the receiving wall extending away from the base wall along an elevation axis that is perpendicular to the lateral axis such that the base and receiving walls define a circuit channel, the base wall extending away from the receiving wall along a mating axis that is perpendicular to the elevation and lateral axes;
   wherein the base and receiving walls are shaped to hold a flex circuit assembly within the circuit channel, in which the flex circuit assembly includes a fiber-routing substrate and corresponding segments of optical fibers that extend within the fiber-routing substrate, the receiving wall having a bend surface that curves from a first direction along the mating axis to a second direction as the receiving wall extends away from the base wall, the first and second directions having directional components that are in opposite directions along the mating axis, the bend surface curving from the first direction to the second direction such that the fiber-routing substrate satisfies a bend radius of the optical fibers when held by the bend surface.

2. The organizer tray of claim 1, wherein the receiving wall is a first receiving wall and the organizer tray includes a second receiving wall that opposes the first receiving wall with the circuit channel therebetween, the second receiving wall having a curved shape that is also configured to hold the fiber-routing substrate such that the fiber-routing substrate satisfies the bend radius of the optical fibers.

3. The organizer tray of claim 1, wherein the base and receiving walls form a tray body, the organizer tray further comprising a protective cover coupled to the tray body and extending over the circuit channel, the protective cover configured to protect the flex circuit assembly within the circuit channel.

4. The organizer tray of claim 3, wherein the receiving wall is a first receiving wall and the organizer tray includes a second receiving wall that opposes the first receiving wall with the circuit channel therebetween, the second receiving wall having a curved shape, the protective cover coupling to each of the first and second receiving walls.

5. The organizer tray of claim 3, wherein at least one of the protective cover or the receiving wall define apertures configured to receive corresponding optical fibers of the flex circuit assembly.

6. The organizer tray of claim 3, wherein the protective cover includes a cover wall, the cover wall having a convex shape to enlarge the circuit channel defined between the cover wall and the tray body.

7. The organizer tray of claim 1, wherein the organizer tray is configured to be secured to a support frame or circuit board, the base and receiving walls being portions of a single unitary piece that is discrete with respect to the support frame or circuit board.

8. A fiber-routing assembly comprising:
   a flex circuit assembly including a fiber-routing substrate and optical fibers that are coupled to the fiber-routing substrate along corresponding fiber segments, the corresponding fiber segments having predetermined paths along the fiber-routing substrate and being held in fixed positions with respect to one another by the fiber-routing substrate, the optical fibers having corresponding fiber tails that extend away from the fiber-routing substrate; and
   an organizer tray comprising a base wall and a receiving wall coupled to each other, the base and receiving walls extending parallel to each other along a lateral axis, the receiving wall extending away from the base wall along an elevation axis that is perpendicular to the lateral axis such that the base and receiving walls define a circuit channel, wherein the fiber-routing substrate is positioned within the circuit channel and is held by the base and receiving walls, the fiber-routing substrate having a curved contour that satisfies a bend radius of the optical fibers, wherein the fiber tails are positioned over the fiber-routing substrate within the circuit channel.

9. The fiber-routing assembly of claim 8, wherein the receiving wall is a first receiving wall and the organizer tray includes a second receiving wall that opposes the first receiving wall with the base wall extending therebetween, the curved contour being a first curved contour, the second receiving wall holding the fiber-routing substrate such that the fiber-routing substrate has a second curved contour that satisfies a bend radius of the optical fibers.

10. The fiber-routing assembly of claim 8, wherein the receiving wall has a bend surface, the fiber-routing substrate extending along the bend surface, wherein the bend surface is substantially C-shaped when viewed along the lateral axis.

11. The fiber-routing assembly of claim 8, wherein the fiber-routing substrate includes a center portion that extends along the base wall and a curved portion that extends along the receiving wall, the center portion extending generally along a mating axis that is perpendicular to the elevation and lateral axes, wherein the curved portion extends in different first and second directions, the first and second directions having directional components that are in opposite directions along the mating axis.

12. The fiber-routing assembly of claim 8, wherein at least one of the fiber tails forms a loop segment that is positioned within the circuit channel, the loop segment including an inflection point.

13. The fiber-routing assembly of claim 8, wherein the organizer tray further comprises a protective cover extending over the circuit channel, the protective cover configured to protect the flex circuit assembly within the circuit channel.

14. The fiber-routing assembly of claim 8, wherein the base and receiving walls are portions of a single unitary piece that is discrete with respect to the support frame or circuit board to which the organizer tray is configured to be mounted.

15. An electro-optical (EO) module comprising:
a circuit board;
a plurality of active devices mounted to the circuit board and configured to process data signals; and
a fiber-routing assembly comprising:
 a flex circuit assembly including a fiber-routing substrate and optical fibers that are coupled to the fiber-routing substrate along corresponding fiber segments, the optical fibers having first fiber tails and second fiber tails that extend in generally opposite directions away from the fiber-routing substrate, the optical fibers configured to transmit the data signals therethrough; and
 an organizer tray having a fixed position with respect to the circuit board and defining a circuit channel, the organizer tray holding the fiber-routing substrate within the circuit channel such that the fiber-routing substrate has a curved contour that satisfies a bend radius of the optical fibers; and
 wherein at least one of the first fiber tails or the second fiber tails is positioned over the fiber-routing substrate within the circuit channel.

16. The EO module of claim 15, wherein the organizer tray includes a base wall and a receiving wall coupled to each other, the base and receiving walls extending parallel to each other along a lateral axis, the receiving wall extending away from the base wall along an elevation axis that is perpendicular to the lateral axis such that the base and receiving walls define the circuit channel, wherein the fiber-routing substrate is positioned within the circuit channel and held by the base and receiving walls.

17. The EO module of claim 15, wherein the active devices includes at least one EO engine that is configured to transform the data signals between an electrical signal form and an optical signal form.

18. An electro-optical (EO) module comprising:
a circuit board;
a plurality of active devices mounted to the circuit board and configured to process data signals;
a fiber-routing assembly comprising:
 a flex circuit assembly including a fiber-routing substrate and optical fibers that are coupled to the fiber-routing substrate along corresponding fiber segments, the optical fibers configured to transmit the data signals therethrough; and
 an organizer tray having a fixed position with respect to the circuit board and defining a circuit channel, the organizer tray holding the fiber-routing substrate within the circuit channel such that the fiber-routing substrate has a curved contour that satisfies a bend radius of the optical fibers; and
a face plate configured to engage optical cable assemblies, the face plate having a fixed position with respect to the circuit board, wherein the organizer tray has a receiving wall that is spaced apart from the face plate and holds the fiber-routing substrate in the curved contour, the optical fibers extending in a direction from the face plate toward the receiving wall, wherein the optical fibers extend above the receiving wall or through one or more apertures of the receiving wall.

19. The EO module of claim 18, wherein the circuit board has a loading edge, the face plate and the loading edge being separated by an operative gap, the organizer tray being positioned within the operative gap.

20. The EO module of claim 18, wherein the organizer tray includes a base wall that is coupled to the receiving wall, the base and receiving walls extending parallel to each other along a lateral axis, the receiving wall extending away from the base wall along an elevation axis that is perpendicular to the lateral axis, wherein the base and receiving walls define the circuit channel, the fiber-routing substrate including a center portion that extends along the base wall and a curved portion that extends along the receiving wall, the center portion extending generally along a mating axis that is perpendicular to the elevation and lateral axes, wherein the curved portion extends in different first and second directions, the first and second directions having directional components that are in opposite directions along the mating axis.

* * * * *